(12) United States Patent
Tuan

(10) Patent No.: US 9,645,983 B1
(45) Date of Patent: May 9, 2017

(54) MODIFYING A DOCUMENT AT A SCRIPT PROCESSING SERVER USING A CLIENT DEVICE'S STATE INFORMATION

(71) Applicant: AMAZON TECHNOLOGIES, INC., Reno, NV (US)

(72) Inventor: Te-Lin Tuan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 519 days.

(21) Appl. No.: 13/920,952

(22) Filed: Jun. 18, 2013

(51) Int. Cl.
   *G06F 17/00* (2006.01)
   *G06F 17/22* (2006.01)

(52) U.S. Cl.
   CPC ................ *G06F 17/2247* (2013.01)

(58) Field of Classification Search
   None
   See application file for complete search history.

(56) References Cited

U.S. PATENT DOCUMENTS

| | | | | |
|---|---|---|---|---|
| 8,719,451 B1* | 5/2014 | Colton | ................ | G06F 17/3089 709/248 |
| 2003/0014478 A1* | 1/2003 | Noble | .................. | G06F 9/5083 709/203 |
| 2003/0088716 A1* | 5/2003 | Sanders | .................... | G06F 8/71 719/330 |
| 2005/0027823 A1* | 2/2005 | Rana | ................ | G06F 17/30905 709/219 |
| 2007/0061700 A1* | 3/2007 | Kothari | ............. | G06F 17/30905 715/234 |
| 2009/0182803 A1* | 7/2009 | Barton | .............. | G06F 17/30905 709/203 |
| 2012/0136926 A1* | 5/2012 | Dillon | ............... | G06F 17/30902 709/203 |

OTHER PUBLICATIONS

Fielding, R. et al., "Hypertext Transfer Protocol—HTTP/1.1"; Jun. 1999, Internet Engineering Task Force, RFC 2068, pp. 1-114.*

* cited by examiner

*Primary Examiner* — Asher Kells
(74) *Attorney, Agent, or Firm* — Lindauer Law, PLLC

(57) ABSTRACT

Before delivery to a user device, a document such as a hypertext markup language (HTML) file which includes one or more scripting elements is pre-processed by a processing server. The processing server renders the document to generate a processed document. The processing includes execution of one or more scripts in the document, including loading and initializing. This execution generates HTML fragments which are inserted into a document object model ("DOM") tree. The processed document is sent along to the user device, which may quickly render the processed document and paint to a display or otherwise present output.

20 Claims, 9 Drawing Sheets

MODIFYING A DOCUMENT AT A SCRIPT PROCESSING SERVER USING A CLIENT DEVICE'S STATE INFORMATION

BACKGROUND

User devices may be used to access web pages, electronic books ("eBooks"), audio, video, or other documents. These documents may include or otherwise reference elements known as "widgets" which may use a scripting language to provide various functionality to the user.

Figure 1:
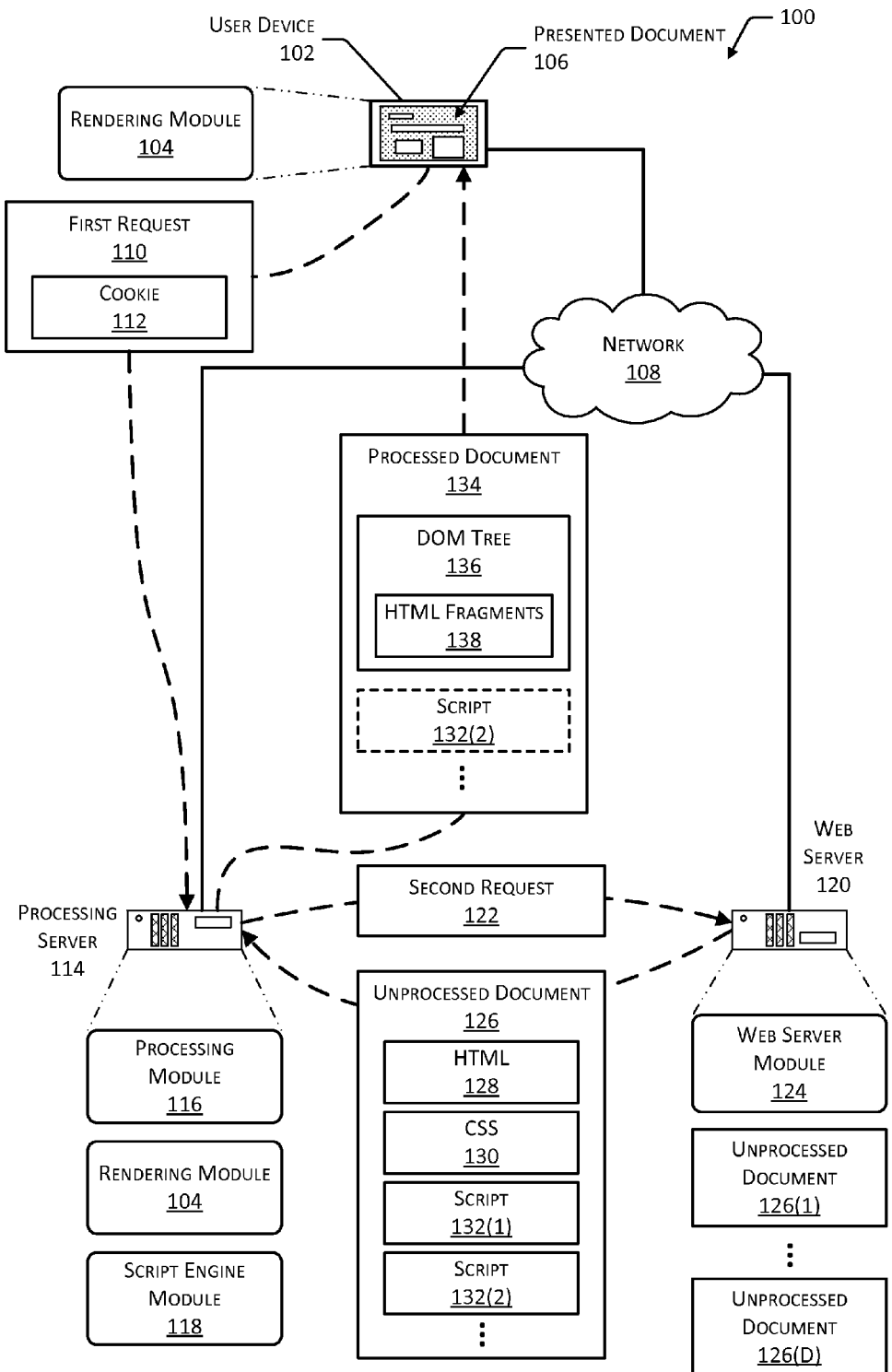
FIG. 1 is an illustrative system for providing processed documents to a user device, in which the processed documents include HTML fragments representative of one or more scripts.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Users with user devices access a wide variety of information and services. Internet merchants, service providers, and so forth provide various user interfaces with which the users may interact. As the sophistication of users continues to increase, user interfaces continue to become more sophisticated as well. This sophistication may result in increased complexity with regard to various elements in the user interface, such as user controls, input processing, and so forth. These elements may include web page widgets ("widgets") or other equivalent constructs which use scripts to provide functionality. The scripts provide rich functionality which may be platform-agnostic, such that a variety of different user devices may use the scripts. The scripts may be considered programmatic expressions in an intermediate language which is compiled at runtime on the executing device.

A particular web page, such for a web merchant, may include many widgets. Traditionally these scripts have been executed on the user device by a script engine module. During execution the script is initialized and data or other resources, which are called by the widget, may be requested and received. Different scripts may require different lengths of time to initialize, as well as availability of different resources to initialize. As a result, presentation of the web page which includes widgets or other scripts may experience delays. These delays may result in an adverse user experience while the user waits for the web page to load.

Described in this disclosure are systems and techniques for using a processing server to generate a processed document which may be provided to the user device. The processing server accepts unprocessed documents which include one or more pieces of hypertext markup language ("HTML") code, or another markup language, and one or more scripts. A rendering module on the processing server processes the HTML to generate a document object model ("DOM") tree. A script engine module also on the processing server executes one or more of the scripts. The processing server is configured to act during rendering and script execution as if it was the user device. This may include simulating or constraining these operations based on hardware and software resources available on the user device, passing along data identifying a particular user device or user logged into that device, and so forth. As a result, the execution of the script includes initialization and the corresponding setup for execution.

Execution of the script by the script engine module results in generation of one or more HTML fragments which express the functionality described by the scripts. The HTML fragments are then inserted into the DOM tree. The processed document is made up of at least the DOM tree and the HTML fragments which have been inserted therein.

The user device receives the processed document. Because the script engine module of the processing server has already executed the script and generated the associated HTML fragments, the user device need not execute the script. Instead, a rendering module of the user device uses the HTML fragments to provide the associated functionality on the user device. As a result, the user may experience a reduction in the latency or delay in painting or presenting elements of the processed document to output devices of the user device, compared to the presentation of the unprocessed document.

In some implementations the unprocessed document may include more than one script. For performance or other reasons, a subset of those scripts may be executed by the processing server and provided as HTML fragments. In this implementation, some scripts may be passed by the processing server and remain as scripts in the processed document, for eventual execution locally on the user device. For example, a first script configured to present a complex interactive user interface element may be processed into HTML fragments, while a second script which is configured to accept keyboard input may be passed through into the processed document. The first script is executed on the processing server, while the second script is executed on the user device. In these implementations, the user device may have a script engine module as well to provide for the local execution of the scripts.

The processing server may be able to execute and initialize the scripts more quickly than the user device due to significantly greater availability to various resources. These resources may include processor/computational capability, memory, network bandwidth, priority access to the web server, data storage servers, and so forth. As a result, the processing server is able to more quickly execute the script, generate the HTML fragments, and pass along the processed document which then may be presented by the user device.

Furthermore, because the processing server with greater resources than the user device is available, more complicated or resource intensive scripts may be used and deployed to the user devices than would otherwise be possible. For example, a complex script may execute on the user device in ten seconds, but may be executed and provided by the processing server in two seconds. As a result, the user device in conjunction with the processing server is able to provide a user experience which would otherwise be operationally infeasible by the user device alone.

Using the techniques described in this disclosure, the user experience is improved. Time to paint or otherwise present output is reduced. Documents which include scripts that would otherwise be infeasible to execute on the particular user device may still be presented. As a result, users are more easily able to consume content such as web pages, electronic books, and so forth.

Illustrative System

FIG. 1 is an illustrative system 100 for providing processed documents. A user device 102 is depicted. While a single user device 102 is shown, it is understood that the system as described may support more than one user device 102. The user device 102 may include tablet computers, personal computers, electronic book readers, gaming consoles, smartphones, wearable computing devices, and so forth.

The user device 102 includes a rendering module 104. The rendering module 104 is configured to accept input such as one or more files expressed in a markup language including, but not limited to, hypertext markup language ("HTML"). The rendering module 104 takes input and provides a presented document 106 to one or more output devices such as a display, speaker, haptic output device, and so forth. For example, in the case of visual output, the rendering module 104 takes the input and "paints" or otherwise provides an image for the display to output. In some implementations, the user device 102 may include a script engine module 118 as described below.

The rendering module 104 may be a standalone module, or may be incorporated into other modules or applications, such as a web browser. The rendering module 104 may also be known as a layout engine, web browser engine, and so forth. One example of a rendering module 104 is WebKit® as promulgated at www.webkit.org.

The user device 102 is configured to couple to one or more networks 108. The networks 108 may include a wireless wide area network ("WWAN"), wireless local area network ("WLAN"), cabled local area network ("LAN"), personal area networks ("PAN"), and so forth. For example, the network 108 may couple to the Internet or other data service enabling the transmission of information.

The user device 102 may be configured to send, using the network 108, one or more requests. These requests may be for a resource such as a document to be returned to the user device 102. A first request 110 may include information such as a cookie 112, which provides state information which may be of use to a service processing the first request 110. For example, the cookie 112 may include information about the identity of the user logged into the user device 102, information of the last document provided to the user device 102, and so forth. The first request 110 may also include other information such as a uniform resource locator ("URL"), uniform resource identifier ("URI"), information about the user device 102, and so forth. For example, the first request 110 may include information about screen resolution, speaker configuration, haptic output capabilities, and so forth of the user device 102.

The user device 102 sends the first request 110 to another device, such as a processing server 114. The processing server 114 includes a processing module 116, a rendering module 104, and a script engine module 118. These modules are discussed in more detail below. The processing server 114 is configured to act as an intermediary between the user device 102 and a web server 120. In some implementations, the processing server 114 may perform other functions, such as those of a load balancer, proxy server, caching device, indexing server, and so forth.

The processing module 116 mediates the interaction between the user device 102 and the web server 120. For example, the processing module 116 may accept the first request 110 which includes the cookie 112 from the user device 102 and provides that information as a second request 122 to the web server 120. The second request 122 may be based at least in part on the first request 110. For example, the second request 122 may include the cookie 112 as provided in the first request 110. The second request 122 may differ from the first request 110 in indicating compatibility with a particular type of rendering module 104, script engine module 118, modifying destination addresses, and so forth.

The web server 120 includes a web server module 124. The web server module 124 is configured to receive requests and provide one or more actions based on the requests. For example, the web server module 124 may comprise the Apache® HTTP server as promulgated by www.apache.org. The actions taken by the web server module 124 may include storing data, retrieving data, and so forth. Responsive to receiving the second request 122, the web server module 124 returns one or more unprocessed documents 126 to the processing server 114. As described below with regard to FIG. 4, in some implementations the web server 120 may receive the first request 110 from the user device 102 and may send the unprocessed document 126 to the processing server 114, rather than returning the unprocessed document to the user device 102.

The unprocessed document 126 may include, or is associated with, one or more components. These components may include markup language files containing data expressed in one or more of extensible markup language ("XML"), voice XML ("VXML"), standard generalized markup language ("SGML"), or hypertext markup language ("HTML"). While HTML 128 is depicted, it is understood that in other implementations other markup languages may be used in addition to, or instead of, HTML. The unprocessed document 126 may include one or more other components such as cascading style sheets ("CSS") 130, scripts 132, and so forth. The scripts 132 comprise a client-side script, which is configured to execute on a script engine module of the user device 102. The script 132 is configured to execute on the user device 102, rather than a server such as the web server 120. In some implementations the script 132 may be described as a client-side script as compared to a server side script which is configured to execute on a server as part of a process of providing unprocessed documents 126. In some implementations, the script 132 (or "script") may comprise JavaScript. JavaScript® is promulgated by Netscape Communications of Mountain View, Calif.

The processing server 114 is configured to process the unprocessed document 126. The processing module 116 accepts the unprocessed document 126 and proceeds to process the unprocessed document 126 using the rendering module 104 and the script engine module 118. The rendering module 104, as described above, is configured to use input comprising the HTML 128 or other markup language, the CSS 130, and so forth to provide output which is configured to be presented to the user by the user device 102. The rendering module 104 executing on the processing server 114 may be configured to operate as a headless browser which renders the markup language without presentation to the user. In one implementation, the rendering module 104 may execute on a server which does not have a user accessible display upon which the rendered content may be presented.

The script engine module 118 executes one or more of the scripts 132, or a portion thereof. In one implementation, the script engine module 118 may comprise PhantomJS as promulgated by www.phantomjsorg. The script engine module 118 is configured to process the scripts 132 into code which is executable on the device on which the script engine module 118 is executing, such as the processing server 114 or the user device 102. In some implementations, the rendering module 104 and the script engine module 118 on the processing server 114 may be configured to render the unprocessed document 126 in such a fashion as to mimic the behavior of the user device 102. For example, the script engine module 118 may initialize the script 132 using information included in the first request 110, such as device state data, device capabilities, and so forth.

The processing module 116, based on output from the rendering module 104 and the script engine module 118, generates a processed document 134. During processing, the rendering module 104 may generate a document object model ("DOM") tree 136 or other user interface model from the markup language, such as the HTML 128. At least a portion of the user interface model may be expressed using a markup language, such as HTML. The user interface model may provide an interface which is neutral with regard to platform or markup language. The user interface model may allow applications or scripts 132 to dynamically access and update one or more of the content, structure, or style of documents. In some implementations, the user interface model may provide an application programming interface ("API") for documents containing markup language such as HTML 128, scripts 132, and so forth. The terms "DOM tree 136" and "HTML 128" are used for ease of discussion, and not necessarily by way of limitation. For example, in other implementations the user interface model may be a data structure other than the DOM tree 136.

During execution of the script 132, the script engine module 118 generates one or more HTML fragments 138. These HTML fragments 138 are configured to be used by the rendering module 104 on the user device 102 to present information to the user, receive input from the user, and so forth.

In some implementations at least a portion of the script 132 from the unprocessed document 126 may be left unexecuted, or preserved in script form. For example, a particular script 132 may be designated for execution on the user device 102, rather than the processing server 114.

The processed document 134 is provided to the user device 102. The rendering module 104 accepts the processed document 134 and uses the previously generated DOM tree 136 with the included HTML fragments 138 to provide the presented document 106. For those scripts 132 which have been processed and provided as HTML fragments 138, the time to present or paint the presented document 106 may be significantly reduced. In some implementations, the user device 102 may include a script engine module 118 which is configured to execute the scripts 132 which have not been pre-processed, such as 132(2) illustrated here.

In some implementations the functions of the web server 120 and the processing server 114 may be combined. For example, the web server 120 may incorporate the processing module 116, the rendering module 104, and the script engine module 118.

The processing server 114 may provide processed documents 134 to other devices or modules, such as an indexing module. An indexing module, such as used by a search engine, is configured to scan documents and build or update searchable data structures. Elements of unprocessed documents 126, such as the script 132, may be inaccessible or unparseable by these indexing modules. For example, information presented as part of a user interface element using JavaScript may not be indexed by the indexing module. The indexing module may be configured to use the processing module 116 to generate one or more of the processed documents 134, which may then be indexed.

Figure 2:
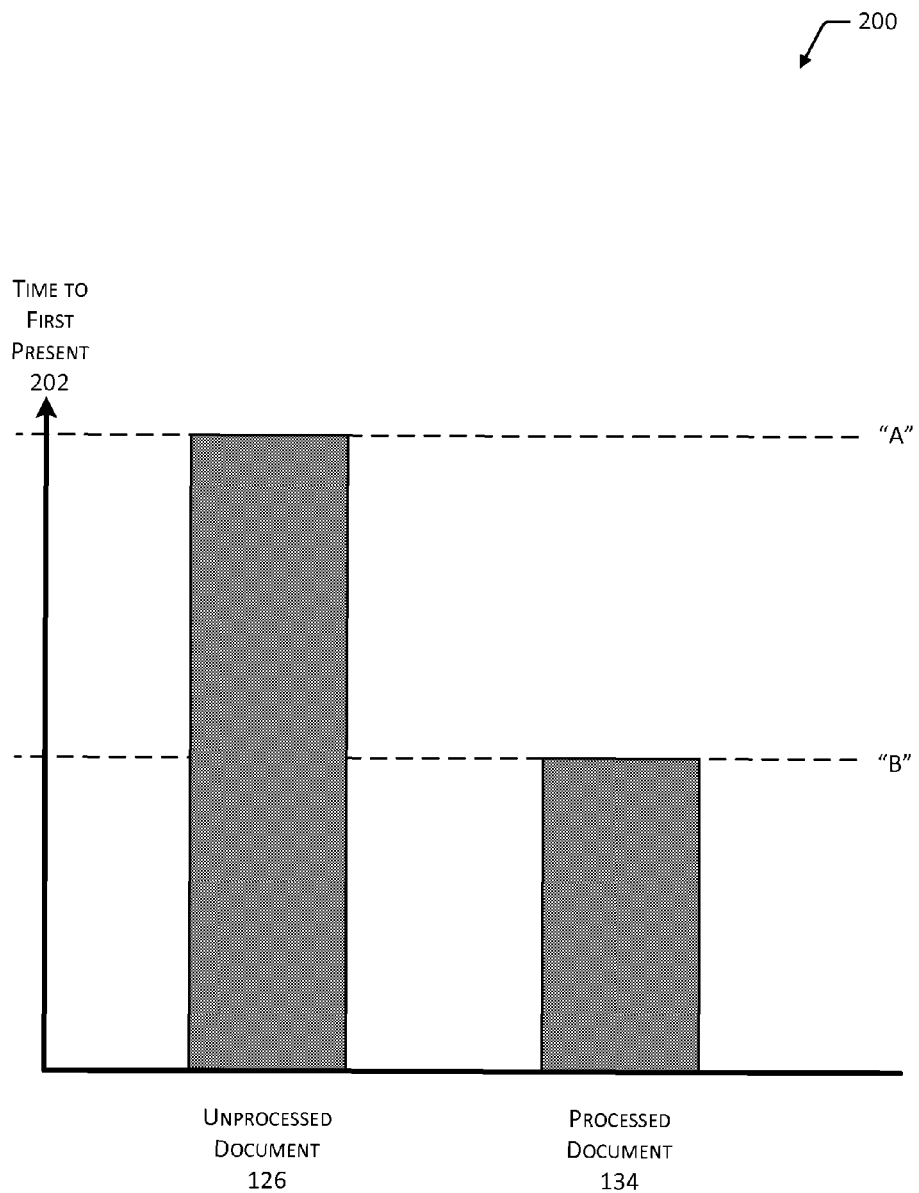
FIG. 2 is a graph illustrating a relative difference in time to present an unprocessed document and a processed document on the user device.

FIG. 2 is a graph 200 illustrating a relative difference in time to present the unprocessed document 126 and the processed document 134 on the user device 102. As described above, the processing server 114 may have more resources available for executing the scripts 132 than the user device 102. By processing the scripts 132 and placing the HTML fragments 138 into the DOM tree 136, the user device 102 may provide the presented document 106 more quickly than executing the script 132 on the user device 102 itself.

In this illustration, time to first present 202 the presented document 106 is illustrated as increasing along a vertical axis. This may be the time to first paint graphical elements on the display of the user device 102. The output of the presented document 106 may be ongoing, that is, as elements of the processed document 134 continue to be received, the presented document 106 may be updated. The unprocessed document 126 is depicted as requiring a time "A" from start of execution until first elements are output, such as painted to the display or emitted by a speaker. As described above, the process of executing the script 132 may use various resources such as memory, processor time, calls to other devices or services, and so forth.

In comparison, the processed document 134 as rendered by the rendering module 104 of the user device 102 exhibits a time to first presentation 202 of "B", which is less than "A". Because the scripts 132 have been processed as by the processing server 114 into the HTML fragments 138, they are more quickly and readily used by the rendering module 104 of the user device 102 to provide the presented document 106. As a result, use of the processing server 114 may result in significant time savings in providing a first presentation of the presented document 106 to the user. This reduction in time may improve the user experience.

Figure 3:
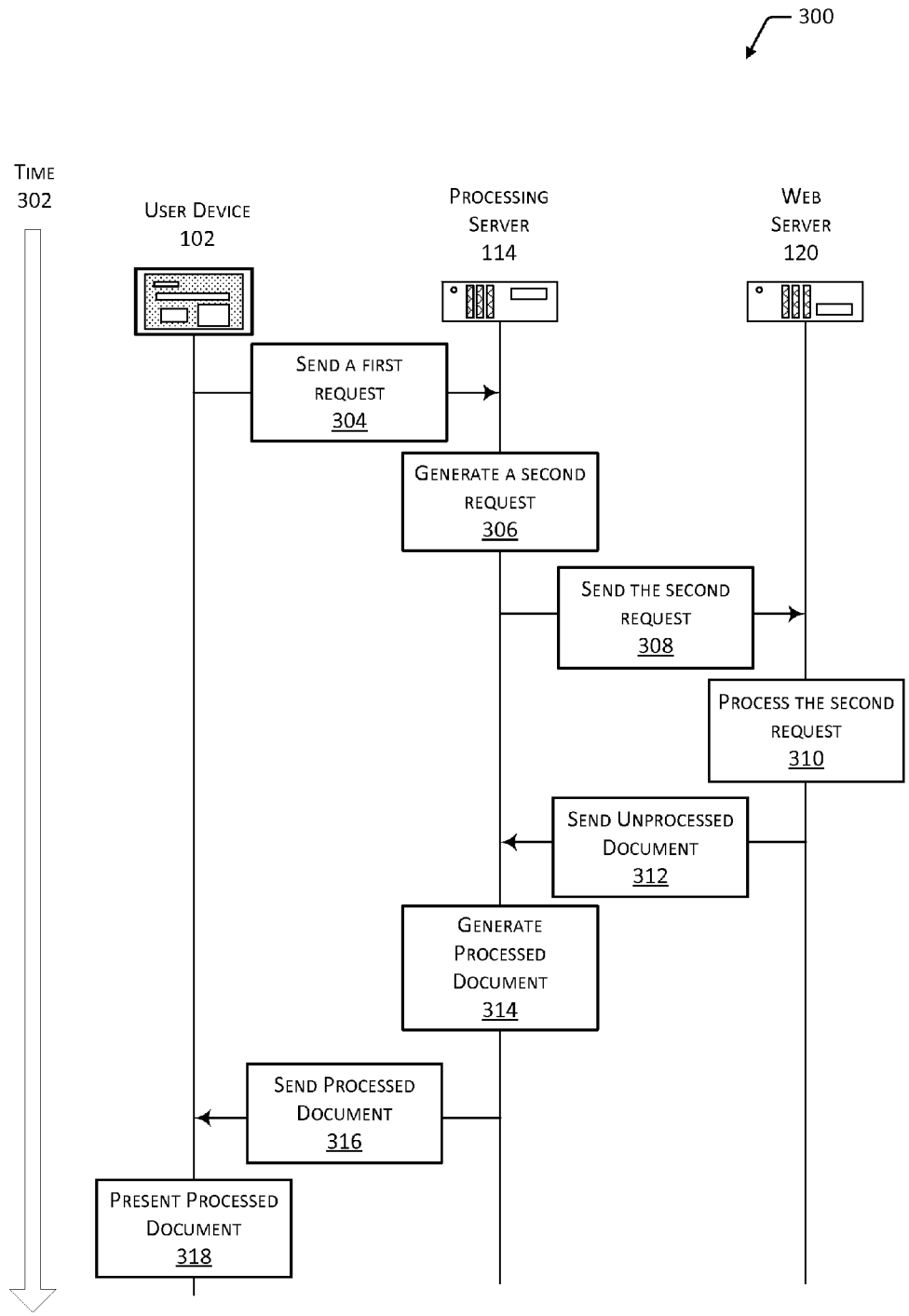
FIG. 3 illustrates a flow of data between devices in which a processing server, configured to generate processed documents, is acting as an intermediary between the user device and a web server.

FIG. 3 is a flow diagram 300 of data between the devices of the system 100 where the processing server 114 acts as an intermediary between the user device 102 and the web server 120. In this illustration, time increases down the page as indicated by arrow 302. At 304, the user device 102 sends a first request 110 to the processing server 114. At 306, the processing server 114 generates a second request 122 based at least in part on the first request 110. In some implementations, the processing server 114 may determine a plurality of web servers 120 which are implicated in fulfilling the first request 110, and may generate separate requests for each of these web servers 120.

At 308, the second request 122 is sent to one or more web servers 120. For example, the second request 122 may be sent using the network 108. The processing server 114, the web server 120, and other devices described herein may be owned or operated by different entities. For example, a network carrier or hardware provider may operate the processing server 114 while the web server 120 may be operated by an online merchant.

At 310, the one or more web servers 120 process the second request 122. For example, the web servers 120 may use information in a uniform resource locator in the second requests 122, information from the cookie 112, and so forth, to determine which of the unprocessed documents 126 to provide.

At 312 the web server 120 sends the unprocessed document 126 to the processing server 114. At 314, the processing module 116 of the processing server 114 uses the rendering module 104 and the script engine module 118 to generate the processed document 134 as described above.

At 316, the processing server 114 sends the processed document 134 to the user device 102. The user device 102 receives the processed document 134, and at 318 presents the processed document 134 using the HTML fragments 138 as the presented document 106. As described above, in some implementations the processed document 134 may include one or more scripts 132 which have not been transformed into HTML fragments 138. In these implementations, a script engine module 118 which is locally stored and executed on the user device 102 may be used to execute these scripts 132.

Figure 4:
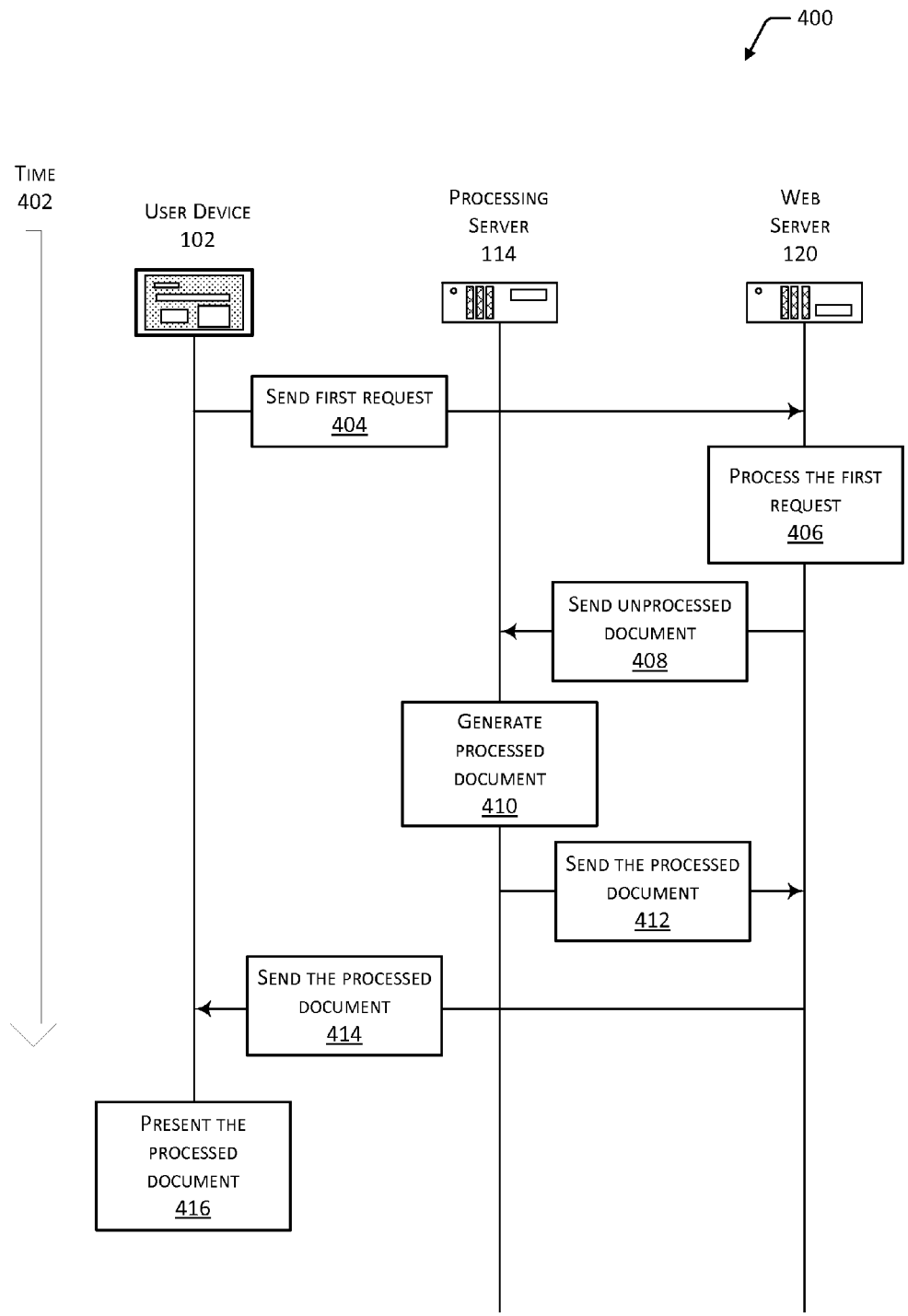
FIG. 4 illustrates a flow of data between devices in which unprocessed documents are sent first to the processing server which generates processed documents and sends these along to the user device.

FIG. 4 is an alternative flow diagram 400 of data between devices in the system 100. In this alternative, the web server 120 receives the first request 110 and uses the processing server 114 to generate the processed document 134. In this illustration, time increases down the page as indicated by arrow 402.

At 404, the user device 102 sends the first request 110 to the web server 120. At 406, the web server 120 processes the first request 110. The web server 120 may determine a destination for a response. The destination may be determined based on one or more of information which is included in the first request 110, previously stored settings, and so forth. For example, the first request 110 may include a tag or data field which indicates that the unprocessed document 126 is to be passed along to the processing server 114. In another example, an administrator may configure the web server 120 to provide the unprocessed document 126 to the processing server 114 by default. This configuration may be dynamic or static. For example, dynamic configuration may be to determine when a particular user device 102 has repeatedly requested a page reload within a predetermined period of time, and send responses associated with that device to the processing server 114 for handling.

At 408, the unprocessed document 126 is sent to the processing server 114. At 410, the processing module 116 of the processing server 114 uses the rendering module 104 and the script engine module 118 to generate the processed document 134 as described above.

In the implementation depicted here, at 412, the processing server 114 may send the processed document 134 to the web server 120. The web server 120 receives the processed document 134.

At 414, the web server 120 sends the processed document 134 to the user device 102. The user device 102 receives the processed document 134. At 416, the user device 102 presents the processed document 134 using the HTML fragments 138 as the presented document 106. As described above, in some implementations the processed document 134 may include one or more scripts 132 which have not been transformed into HTML fragments 138. As above, in these implementations, a script engine module 118 which is locally stored and executed on the user device 102 may be used to execute these scripts 132.

Returning to 412, in another implementation the processing server 114 may send the processed document 134 to the user device 102. The user device 102 receives the processed document 134, which presents the processed document 134 as described above. In this implementation, the processing server 114 may use the destination in the first request 110 to establish communication with the user device 102.

Figure 5:
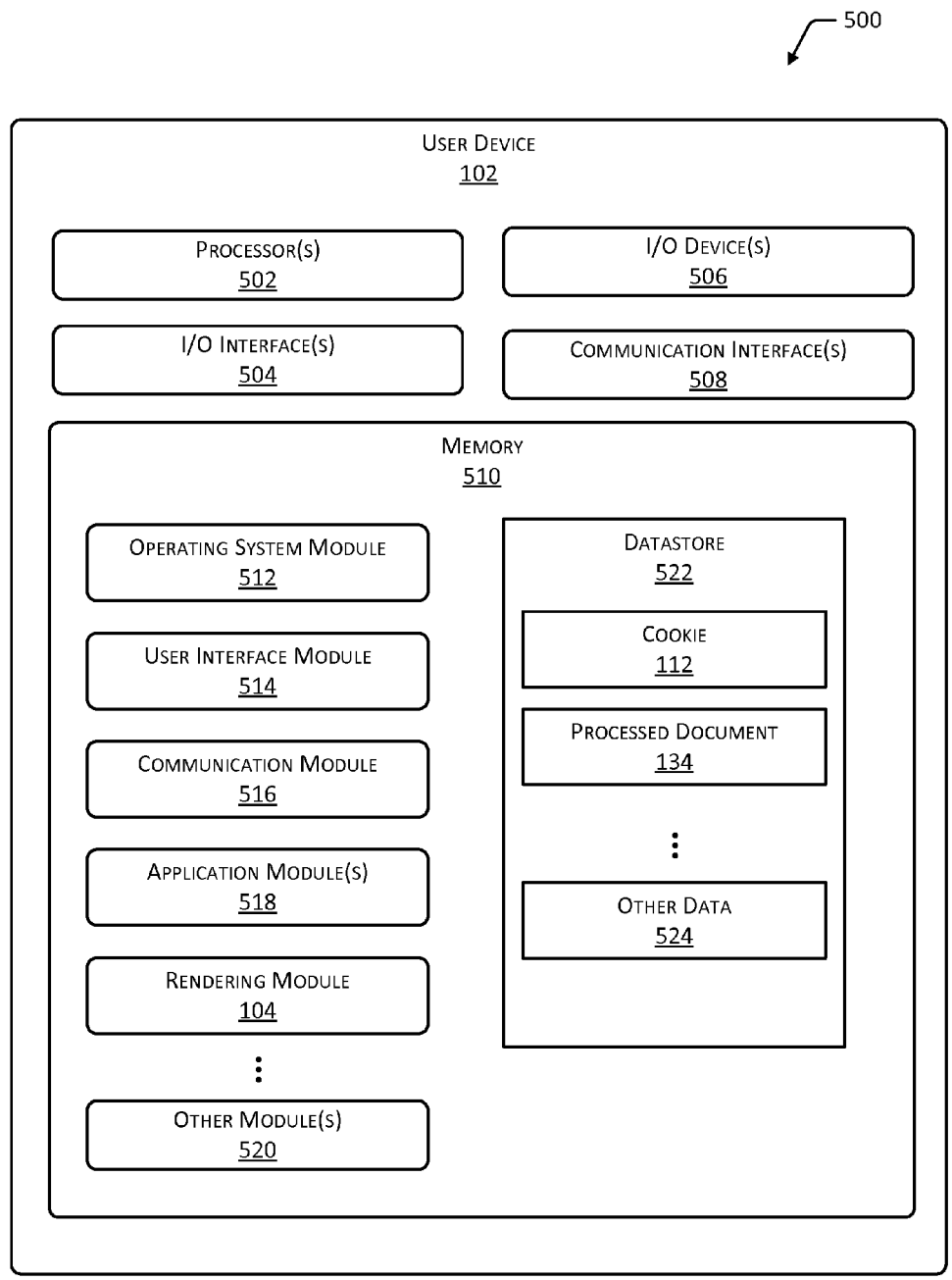
FIG. 5 illustrates a block diagram of the user device configured to present processed documents.

FIG. 5 illustrates a block diagram 500 of the user device 102 which may be configured to provide the presented document 106 to one or more users. The user device 102 may include one or more processors 502 configured to execute one or more stored instructions. The processors 502 may comprise one or more cores. The user device 102 may include one or more input/output ("I/O") interface(s) 504 to allow the processor 502 or other portions of the user device 102 to communicate with other devices. The I/O interfaces 504 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, and so forth.

The I/O interface(s) 504 may couple to one or more I/O devices 506. The I/O devices 506 may include input devices such as one or more of a camera, a microphone, a touch sensor, a button, and so forth. The I/O devices 506 may also include output devices such as one or more of a display, audio speakers, haptic output devices, and so forth. The display may comprise an electrophoretic display, projector, liquid crystal display, interferometric display, light emitting diode display, and so forth. In some embodiments, the I/O devices 506 may be physically incorporated with the user device 102 or may be externally placed.

The user device 102 may also include one or more communication interfaces 508. The communication interfaces 508 are configured to provide communications with the user device 102, the processing server 114, the web server 120, routers, access points, other servers, and so forth. The communication interfaces 508 may include devices configured to couple to one or more networks including PANs, LANs, WLANs, WANs, WWANs, and so forth.

The user device 102 may also include one or more busses or other internal communications hardware or software that allow for the transfer of data between the various modules and components of the user device 102.

As shown in FIG. 5, the user device 102 includes one or more memories 510. The memory 510 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 510 provides storage of computer readable instructions, data structures, program modules and other data for the operation of the user device 102.

The memory 510 may include at least one operating system ("OS") module 512. The OS module 512 is configured to manage hardware resource devices such as the I/O interfaces 504, the I/O devices 506, the communication interfaces 508, and provide various services to applications or modules executing on the processors 502. Also stored in the memory 510 may be one or more of the following modules. These modules may be executed as foreground applications, background tasks, daemons, and so forth.

A user interface module 514 is configured to provide one or more user interface elements to the user with the I/O devices 506 and to accept inputs received from the I/O devices 506. The user interface may include one or more visual, audible, or haptic elements. For example, the user interface may be configured to provide a graphic user interface, an audible user interface, and so forth. The user interface may be configured to present the presented document 106 using the I/O devices 506.

A communication module 516 is configured to support communication between the user devices 102, the processing server 114, the web server 120, and so forth using the network 108. One or more application modules 518 may include one or more of eBook readers, browsers, calculators, word processors, spreadsheets, slideshow presenters, drawing programs, and so forth.

As described above, the rendering module 104 is configured to accept input such as one or more files expressed in a markup language and provide the presented document 106 to one or more output devices such as a display, speaker, haptic output device, and so forth. The rendering module 104 may be standalone module, or may be incorporated into other modules or applications, such as a web browser. During operation, the rendering module 104 generates the DOM tree 136.

In some implementations the memory 510 may also include a script engine module 118 which is configured to execute on the user device 102. The script engine module 118 may be used to process the scripts 132 which are included in the processed document 134 and have not been transformed into HTML fragments 138 by the processing server 114.

Other modules 520 may also be present. For example, a digital rights management module may provide support for presenting or processing content protected using one or more digital rights management schemes.

The memory 510 may also include a datastore 522 to store information. The datastore 522 may use a flat file, database, linked list, tree, executable code, or other data structure to store the information. In some implementations, the datastore 522 or a portion of the datastore 522 may be distributed across one or more other devices including servers, network attached storage devices, and so forth.

As depicted here, the datastore 522 may store the cookie 112, the processed document 134, and so forth. Other data 524 may also be stored. For example, the other data 524 may include user preferences, configuration files, and so forth.

Figure 6:
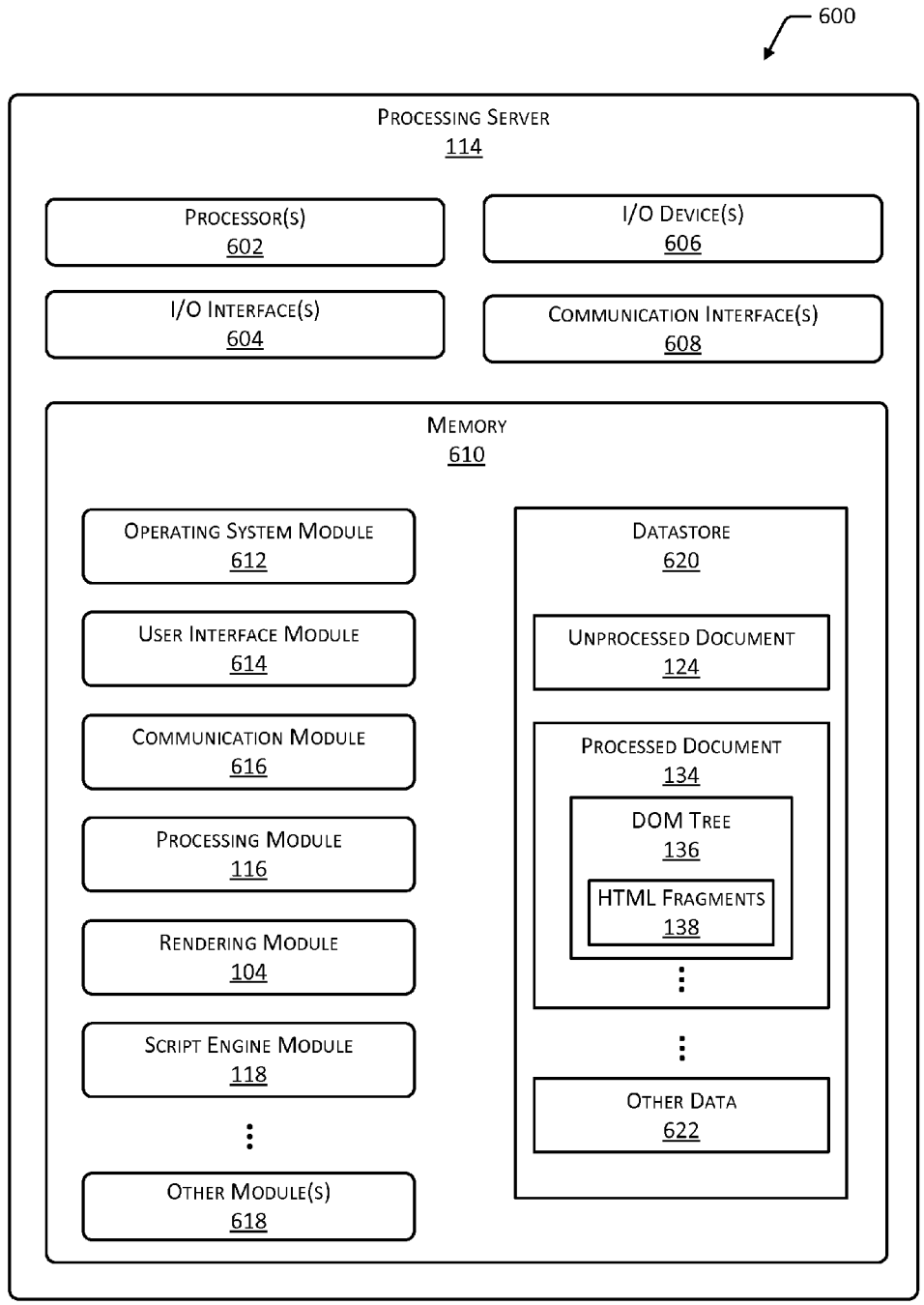
FIG. 6 illustrates a block diagram of the processing server configured to generate processed documents from unprocessed documents.

FIG. 6 illustrates a block diagram 600 of the processing server 114 which may be configured to generate processed documents 134. The processing server 114 may include one or more processors 602 configured to execute one or more stored instructions. The processors 602 may comprise one or more cores. The processing server 114 may include one or more I/O interface(s) 604 to allow the processor 602 or other portions of the processing server 114 to communicate with other devices. The I/O interfaces 604 may comprise I2C, SPI, USB, RS-232, and so forth.

The I/O interface(s) 604 may couple to one or more I/O devices 606. The I/O devices 606 may include input devices such as one or more of a keyboard, mouse, and so forth. The I/O devices 606 may also include output devices such as indicator lights, a display for use by administrative or maintenance personnel, a printer, and so forth. In some embodiments, the I/O devices 606 may be physically incorporated with the processing server 114 or may be externally placed.

The processing server 114 may also include one or more communication interfaces 608. The communication interfaces 608 are configured to provide communications with the user device 102, the web server 120, routers, access points, other servers, and so forth. The communication interfaces 608 may include devices configured to couple to one or more networks including PANs, LANs, WLANs, WANs, WWANs, and so forth.

The processing server 114 may also include one or more busses or other internal communications hardware or software that allow for the transfer of data between the various modules and components of the processing server 114.

As shown in FIG. 6, the processing server 114 includes one or more memories 610. The memory 610 comprises one or more CRSM. The memory 610 provides storage of computer readable instructions, data structures, program modules and other data for the operation of the processing server 114.

The memory 610 may include at least one OS module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A user interface module 614 may be configured to provide one or more application programming interfaces, web interfaces, and so forth. The user interface module 614 is configured to accept inputs and send outputs using the I/O interfaces 604, the communication interfaces 608, or both.

A communication module 616 is configured to support communication with the user device 102, the web server 120, and so forth using the network 108. In some implementations, the communication module 616 may support encrypted communications. For example, hypertext transport protocol secured ("HTTPS") or transport layer security ("TLS") may be supported.

The processing module 116 is configured to coordinate the activities of the rendering module 104, the script engine module 118, and so forth. The processing module 116 may be configured to process the first requests 110, generate the second requests 122, and so forth. In some implementations, the processing module 116 may be configured to work in conjunction with a proxy server, caching server, or other device or system. In these implementations, the processed documents 134 may be stored and provided to requestors instead of the unprocessed documents 126.

As described above, the rendering module 104 is configured to accept input such as one or more files expressed in a markup language and provide output configured for presentation. As described above, the rendering module 104 executing on the processing server 114 may comprise a headless browser. The rendering module 104 may be a standalone module, or may be incorporated into other modules or applications. During operation, the rendering module 104 generates the DOM tree 136. In some implementations, a plurality of rendering modules 104 may be present on the processing server 114. For example, a first rendering module 104(1) may be based on WebKit®, while a second rendering module 104(2) is based on Trident as promulgated by Microsoft Corp. of Redmond, Wash., while a third rendering module 104(3) is based on Gecko as promulgated by the Mozilla Foundation of Mountain View, Calif. Different rendering modules 104 may be selected based on different criteria. The first request 110 may include information about what rendering module 104 is available locally on the user device 102. Based at least in part on this data, the corresponding rendering module 104 may be selected. For example, the user device 102 may use the Gecko rendering module 104, and the processing module 116 may select and use the corresponding Gecko rendering module 104 on the processing server 114 while generating the processed document 134.

As described above, the script engine module 118 is configured to execute one or more of the scripts 132, or a portion thereof. The rendering module 104 and the script engine module 118 on the processing server 114 may be configured to render the unprocessed document 126 in such a fashion as to mimic the behavior of the user device 102. For example, the rendering module 104 and the script engine module 118 may be configured to appear as though they are executing on the user device 102.

Similar to that described above with regard to the rendering module 104, in some implementations a plurality of different script engine modules 118 may be presented. For example, script engine modules 118 may include the Rhino JavaScript engine promulgated by the Mozilla Foundation, V8 as promulgated by Google of Mountain View, Calif., and so forth. Different script engine modules 118 may be selected for use in generating the processed document 134. For example, a data structure may associate the scripts 132 from a particular web server 120 or entity with a particular script engine module 118. In one implementation, selection of the script engine module 118 used may be based on performance, such as which script engine module 118 will generate the HTML fragments 138 faster, which uses fewer resources, and so forth.

As described above, by providing the HTML fragments 138 which are inserted into the DOM tree 136 of the processed document 134, the user device 102 may provide the presented document 106 which includes elements based on script, but for which the user device 102 does not have a corresponding script engine module 118. For example, the script 132 may be in a version of JavaScript which is not supported by the script engine module 118 of the user device 102 or the user device 102 may omit the script engine module 118. However, the rendering module 104 is able to process the HTML fragments 138, allowing the presented document 106 to include features or elements which would not otherwise be supported by the user device 102.

Other modules 618 may also be present. In one implementation, a language translation module may be configured to provide translation between a first human natural language of the unprocessed document 126 and a second human natural language for the processed document 134. For example, the web server 120 may only provide web pages as unprocessed documents 126 in Dutch, while the processed document 134 includes the text translated to English.

The memory 610 may also include a datastore 620 to store information. The datastore 620 may use a flat file, database, linked list, tree, executable code, or other data structure to store the information. In some implementations, the datastore 620 or a portion of the datastore 620 may be distributed across one or more other devices including servers, network attached storage devices, and so forth.

As depicted here, the datastore 620 may store the unprocessed document 126, the processed document 134, and so forth. Other data 622 may also be stored. For example, the other data 622 may include information designating the use of a particular rendering module 104, script engine module 118, and so forth when generating the processed document 134.

Figure 7:
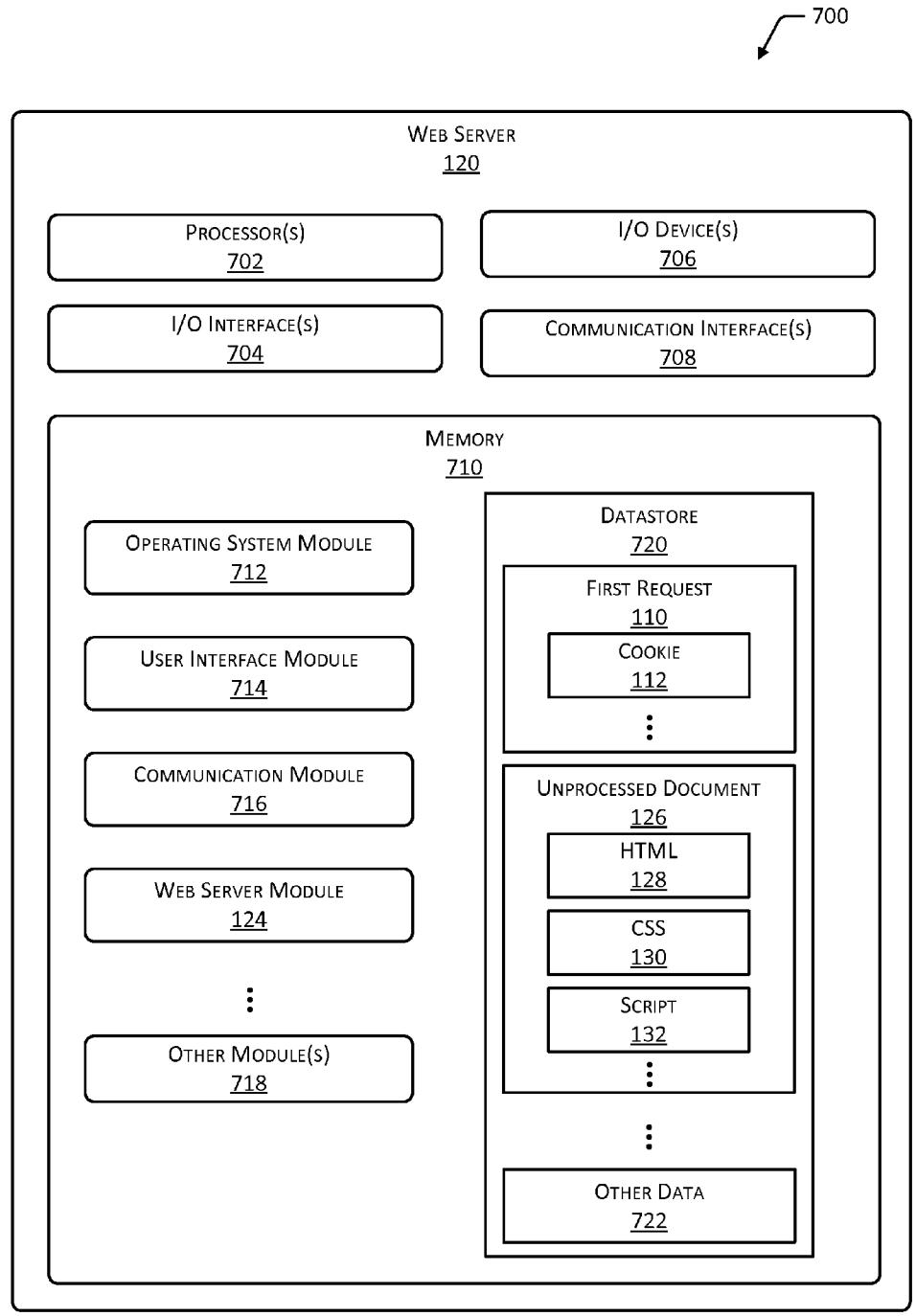
FIG. 7 illustrates a block diagram of the web server configured to provide the unprocessed document to the processing server.

FIG. 7 illustrates a block diagram 700 of the web server 120 configured to provide the unprocessed document 126 to the processing server 114. The web server 120 may include one or more processors 702 configured to execute one or more stored instructions. The processors 702 may comprise one or more cores. The web server 120 may include one or more I/O interface(s) 704 to allow the processor 702 or other portions of the web server 120 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, mouse, and so forth. The I/O devices 706 may also include output devices such as indicator lights, a display for use by administrative or maintenance personnel, a printer, and so forth. In some embodiments, the I/O devices 706 may be physically incorporated with the web server 120 or may be externally placed.

The web server 120 may also include one or more communication interfaces 708. The communication interfaces 708 are configured to provide communications with the user device 102, the processing server 114, routers, access points, other servers, and so forth. The communication interfaces 708 may include devices configured to couple to one or more networks including PANs, LANs, WLANs, WANs, WWANs, and so forth.

The web server 120 may also include one or more busses or other internal communications hardware or software that allow for the transfer of data between the various modules and components of the web server 120.

As shown in FIG. 7, the web server 120 includes one or more memories 710. The memory 710 comprises one or more CRSM. The memory 710 provides storage of computer readable instructions, data structures, program modules, and other data for the operation of the web server 120.

The memory 710 may include at least one OS module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the following modules. These modules may be executed as foreground applications, background tasks, daemons, and so forth.

A user interface module 714 may be configured to provide one or more application programming interfaces, web interfaces, and so forth. The user interface module 714 is configured to accept inputs and send outputs using the I/O interfaces 704, the communication interfaces 708, or both.

A communication module 716 is configured to support communication with the user device 102, the web server 120, and so forth using the network 108. In some implementations, the communication module 716 may support encrypted communications. For example, hypertext transport protocol secured ("HTTPS") or transport layer security ("TLS") may be supported.

The web server module 124 is configured to receive requests and provide one or more actions based on the requests. For example, the web server module 124 may comprise the Apache® HTTP server as promulgated by www.apache.org. The actions taken by the web server module 124 may include storing data, retrieving data, and so forth. Responsive to receiving a request such as the first request 110 or the second request 122, the web server module 124 may be configured to return one or more unprocessed documents 126 to the processing server 114.

Other modules 718 may also be present. In one implementation, an authentication module may be configured to authenticate a particular user or user device 102. For example, the authentication module may inspect the cookie 112 for identifying information and use that information to identify a corresponding user account, if any exists.

The memory 710 may also include a datastore 720 to store information. The datastore 720 may use a flat file, database, linked list, tree, executable code, or other data structure to store the information. In some implementations, the datastore 720 or a portion of the datastore 720 may be distributed across one or more other devices including servers, network attached storage devices, and so forth.

The datastore 720 may store the first request 110, the second request 122, the cookie 112, and so forth. The datastore 720 may also include one or more of the unprocessed documents 126. As described above, the unprocessed documents 126 may include markup language files like XML or HTML 128, CSS 130 files, scripts 132, and so forth. Other data 722 may also be stored. For example, the other data 722 may include configuration data, user account information, and so forth.

While the processing server 114 and the web server 120 are described above in terms of a single device, the same or similar functionality may be provided by one or more devices, such as a server cluster, virtual server, and so forth. For example, the processing module 116, the rendering module 104, the script engine module 118, the web server module 124, and so forth may be executed on virtual servers in a distributed computing environment, accessing data such as the unprocessed documents 126 which are stored in distributed storage servers.

Illustrative Processes

Figure 8:
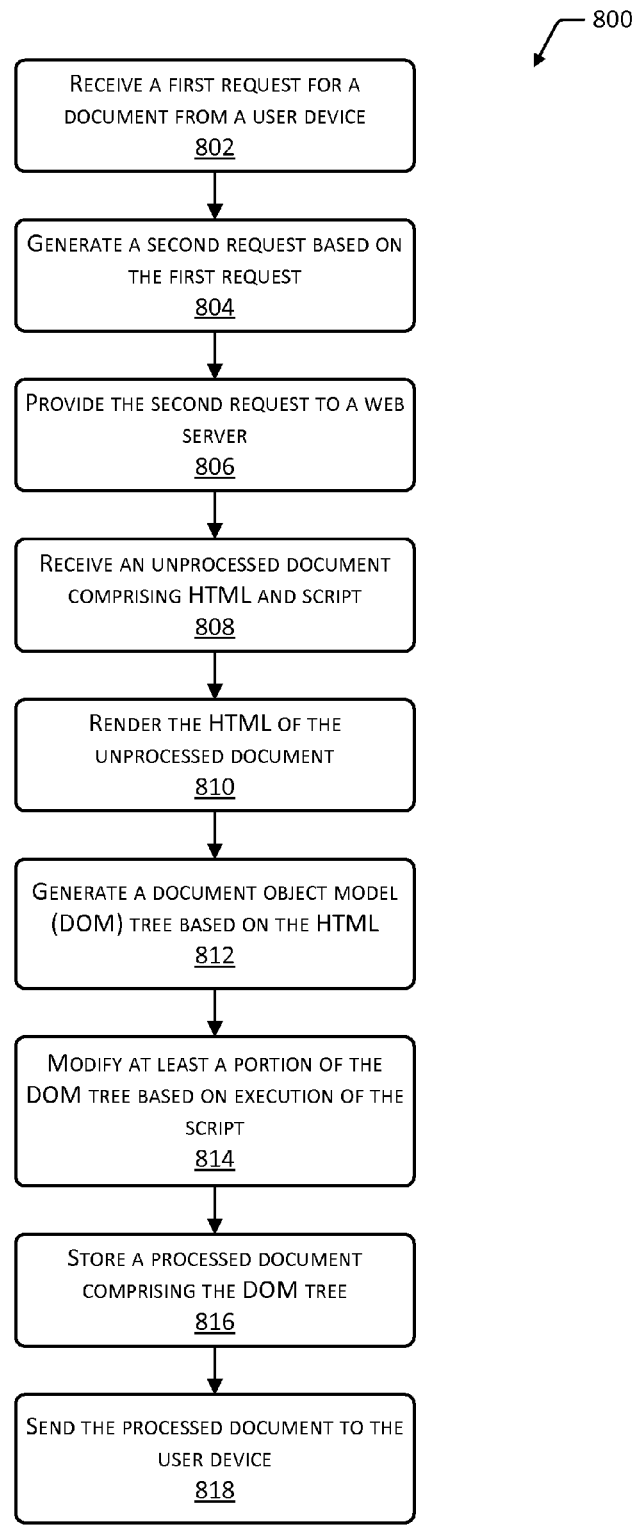
FIG. 8 is a flow diagram of a process of the processing server receiving an unprocessed document and generating a processed document.

FIG. 8 is a flow diagram 800 of a process of the processing server 114 receiving an unprocessed document 126 and generating the processed document 134. One or more of the processing server 114, the web server 120, or another device may implement this process.

Block 802 receives the first request 110 for a document from the user device 102. As described above, the document may comprise markup language and one or more scripts 132. For example, the user device 102 may have requested a web page which includes various widgets to provide functionality such as presenting advertisements, receiving user input, and so forth. As described above, the first request 110 may include one or more cookies 112.

Block 804 generates the second request 122 based at least in part on the first request 110. For example, where the processing server 114 is acting as an intermediary, the processing server 114 may generate the second request 122 using information such as the cookie 112. Where the first request 110 includes a cookie 112, the cookie 112 or data based on the cookie 112 may be included in the second request 122.

Block 806 provides the second request 122 to the web server 120. For example, the processing server 114 may send the second request 122 to the web server 120 using the network 108.

As described above with regard to FIG. 4, in some implementations the user device 102 may send the first request 110 to the web server 120. The processing server 114, the web server 120, or both may be configured to receive address information which is indicative of the user device 102. For example, the address information may comprise an Internet Protocol address.

Block 808 receives the unprocessed document 126 from the web server 120. As described above, the unprocessed document 126 may include one or more of HTML 128 or another markup language, CSS 130 data, script 132, and so forth. In some implementations, the unprocessed document 126 may be associated with script 132. For example, the unprocessed document 126 may include a reference, address, network location, URL, and so forth which refer to a particular script 132.

Block 810 renders the HTML 128 of the unprocessed document 126. For example, the rendering module 104 may be configured to process the HTML 128 or other markup language in the unprocessed document 126.

Block 812, based on the rendering, generates the user interface model, such as the DOM tree 136. The user interface model is based on the markup language such as the HTML 128, CSS 130, and so forth. The generation of the DOM tree 136 may be accomplished by processing the unprocessed document 126 using a headless browser configured to render the content without presentation on a display for use by a user.

Block 814 modifies at least a portion of the user interface model, such as the DOM tree 136, based on execution of the script 132. For example, the script engine module 118 may execute one or more of the one or more scripts 132(1), 132(2), . . . , 132(S) in the unprocessed document 126. The scripts 132 may comprise instructions expressed in a fashion compliant with JavaScript, ECMAScript as promulgated by Ecma International and described in the ECMA-262 and ISO/IEC 16262 specifications, and so forth.

The execution of the script 132 may involve initializing the script 132. This initialization process may set up an initial state for one or more variables used by the script, may determine available resources for execution, and so forth. The execution may also include retrieval of one or more elements indicated by the script 132. For example, the script 132 may call for various display elements, user interface elements, graphics, controls, data access elements, hardware control elements, and so forth which are used by the script 132 during operation. In one implementation the retrieval may include performing one or more Asynchronous JavaScript and XML ("AJAX") transactions.

As described above, the processing server 114 may have a plurality of different script engine modules 118. The processing of the scripts 132 may include determining the rendering module 104, the script engine module 118, or both which produces an output compatible with or equivalent to the rendering module 104, rendering engine module 118, or both configured to execute on the user device 102.

The script engine module 118 generates one or more markup language fragments, such as the HTML fragments 138, from execution of the one or more scripts 132. These markup language fragments may be inserted into the user interface model. For example, the HTML fragments 138 may be inserted into the DOM tree 136. In other implementations, existing markup language fragments in the user interface model may be modified based at least in part on the markup language fragments.

Block 816 stores the processed document 134 which is made up of the user interface model and the markup language fragments. In some implementations, the markup language fragments may be inserted into, or otherwise incorporated within, the user interface model data structure. For example, the processed document 134 may include the DOM tree 136 and the HTML fragments 138. In some implementations the processed document 134 may include one or more scripts 132 which are configured to be executed by the script engine module 118 executing on the user device 102.

As described above with regard to FIG. 2, the processed document 134 is configured such that a time to render on the user device 102 is less than a time to render the unprocessed document 126 on the user device 102.

Block 818 sends the processed document 134 to the user device 102. For example, the processing server 114 may use a network address associated with the first request 110 and send the processed document 134 using the network 108. As described above, the user device 102 is configured to present the processed document 134 with one or more output devices, such as the speakers, display, and so forth. In some implementations, the user interface model alone, such as the DOM tree 136, may be sent to the user device 102.

As described above, in some implementations address information may be received by the processing server 114, the web server 120, or both. The processed document 134 may be sent to this address. For example, as described above with regard to FIG. 4, the user device 102 may send the first request 110 to the web server 120. In one implementation the web server 120 may send the unprocessed document 126 to the processing server 114, receive the processed document 134 back, and provide the processed document 134 to the user device 102. In another implementation, the web server 120 may send the unprocessed document 126 to the processing server 114. The processing server 114 in turn provides the processed document 134 to the user device 102.

Figure 9:
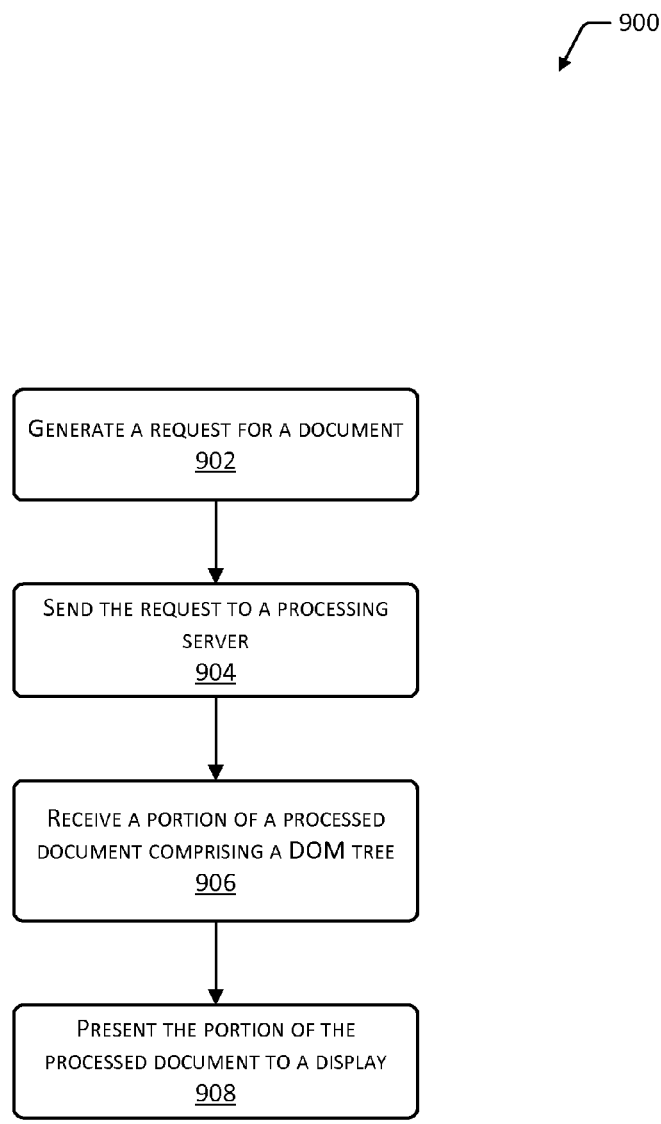
FIG. 9 is a flow diagram of a process of the user device presenting a processed document.

FIG. 9 is a flow diagram 900 of a process of the user device 102 presenting the processed document 134. The user device 102 may implement this process.

Block 902 generates a request for a document. For example, the user may have selected a control in a user interface requesting a particular web page at a URL.

Block 904 sends the request. In one implementation as described above with regard to FIG. 3, the request may be sent to a first server such as the processing server 114. The processed document 134 may then be received from the first server. For example, the first request 110 may be sent to the processing server 114, which in turn responds to the user device 102 with the processed document 134. In another implementation as described above with regard to FIG. 4, the request is sent to a first server such as the web server 120, and the processed document 134 is received from a second server such as the processing server 114.

Block 906 receives a first portion of the processed document 134. As described above, the processed document 134 may include the user interface model and one or more markup language fragments. For example, the processed document 134 may comprise the DOM tree 136 having one or more HTML fragments 138 inserted therein. As described above, the markup language fragments may be based at least in part on execution of one or more scripts 132 by the script engine module 118. For example, the HTML fragments 138 may be based at least in part on execution of one or more portions of JavaScript.

Block 908 presents the first portion of the processed document 134 to one or more of a display, speaker, or haptic output device. For example, the presented document 106 may include various widgets which utilize JavaScript.

Another block, not depicted here, may receive a second portion of the processed document 134. This second portion may be presented to one or more of a display, speaker, or haptic output device. For example, a large graphic file may be presented successively or after the file has been completely transferred to the user device 102.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a communication interface;
a memory storing computer-executable instructions; and
a processor configured to couple to the communication interface, access the memory, and execute the computer-executable instructions to:
receive a first request for a document from a user device, wherein the document comprises hypertext markup language ("HTML") and is associated with a script, and the first request provides state information for the user device;
generate a second request based at least in part on the first request;
provide the second request to a web server, the second request includes information indicative of a rendering engine configured to execute on the user device;
receive an unprocessed document from the web server, wherein the unprocessed document comprises the HTML and the script;
generate a document object model ("DOM") tree based at least in part on the HTML;
execute the script to modify at least one portion of the HTML in the DOM tree using the state information; and send the DOM tree to the user device, after the at least one portion of the HTML in the DOM tree is modified.

2. The system of claim 1, wherein the script is stored within the document or the document comprises an address to the script stored in another location.

3. The system of claim 1, wherein the script comprises JavaScript.

4. The system of claim 1, wherein the processor is further configured to execute the computer-executable instructions to execute the script to modify the at least one portion of the HTML in the DOM tree by:
retrieving one or more HTML elements indicated by the script; and
modifying the one or more HTML elements.

5. The system of claim 1, wherein:
the first request comprises a cookie,
the cookie includes the state information for the user device,
the state information comprises one or more of an identify of a user logged into the user device and information regarding a last document provided to the user, and
the second request further comprises at least a portion of the cookie.

6. A method comprising:
receiving a first request for a document from a device, wherein the first request comprises a cookie which provides state information for the device;
determining compatibility information for the device based at least in part on the first request, wherein the compatibility information indicates compatibility with one or more of a type of rendering module and a script engine module;
generating a second request for an unprocessed document based on the first request and the compatibility information for the device;
sending the second request to the web server;
receiving the unprocessed document from the web server responsive to the second request, wherein the unprocessed document is associated with a script;
generating a user interface model based on the unprocessed document, wherein the user interface model comprises markup language and is compatible with the device;
executing at least a portion of the script to modify at least one portion of the markup language in the user interface model, wherein the executing the at least one portion of the script comprises processing the at least one portion of the script using a rendering engine and the state information for the device; and
sending the user interface model to the device after the executing.

7. The method of claim 6, wherein the user interface model comprises a document object model ("DOM") tree and the markup language comprises one or more of:
hypertext markup language ("HTML"),
standard generalized markup language ("SGML"),
extensible markup language ("XML"), or
voice XML ("VXML").

8. The method of claim 6, wherein the generating the user interface model comprises processing the unprocessed document using a headless browser configured to render content without presentation on a display of the device.

9. The method of claim 6, wherein the user interface model is configured such that a time to render the user interface model on the device is less than a time to render the unprocessed document on the device.

10. The method of claim 6, wherein the script comprises JavaScript, and the executing the at least one portion of the script further comprises:
retrieving one or more elements indicated by the script.

11. The method of claim 6, wherein the first request further comprises one or more of a uniform resource locator, a uniform resource identifier, and information regarding the device.

12. The method of claim 6, further comprising:
the device presenting the user interface model with one or more output devices.

13. The method of claim 6, further comprising:
receiving address information which is indicative of the device; and
using the address information to send the user interface model to the device.

14. The method of claim 6, further comprising:
sending separate requests to a plurality of web servers.

15. The method of claim 6, further comprising:
selecting the rendering engine based at least on the compatibility information for the device.

16. A computer-implemented method comprising:
receiving a request for content at a web server, wherein the request comprises information regarding a device and information regarding a destination address for a response;
in response to the request, sending an unprocessed document from the web server to a processing server, wherein the unprocessed document is associated with a script, and wherein the processing server is configured to simulate operations based on resources available on the device;
generating a document object model ("DOM") tree at the processing server based on the unprocessed document, wherein the DOM tree comprises markup language;
executing at least a portion of the script to modify at least one portion of the markup language in the DOM tree;
after the executing, sending the DOM tree to the web server; and
after receiving the DOM tree at the web server, sending the DOM tree from the web server to the device that is configured to present at least one portion of the content.

17. The computer-implemented method of claim 16, wherein the at least one portion of the content is presented using one or more of a display, a speaker, or a haptic output device.

18. The computer-implemented method of claim 16, wherein the at least one portion of the markup language was generated by execution of one or more scripts by the processing server.

19. The computer-implemented method of claim 16, further comprising:
receiving the DOM tree at the device, from the web server.

20. The computer-implemented method of claim 16, wherein:
the DOM tree is received at the web server from the processing server.

* * * * *